United States Patent [19]

Endo

[11] Patent Number: 4,532,671
[45] Date of Patent: Aug. 6, 1985

[54] RESILIENT STRUCTURE FOR SECURING CARPETING OF DIFFERENT THICKNESSES

[75] Inventor: Toshio Endo, Koshigaya, Japan

[73] Assignee: Nissan Motor Company, Limited, Kanagawa, Japan

[21] Appl. No.: 512,563

[22] Filed: Jul. 11, 1983

[30] Foreign Application Priority Data

Aug. 25, 1982 [JP] Japan ................................ 57-146184

[51] Int. Cl.³ ............................................. A47G 27/04
[52] U.S. Cl. ............................................. 16/7; 16/8; 403/12
[58] Field of Search ...................... 16/4, 5, 7, 8, 9, 16, 16/17; 403/12

[56] References Cited

U.S. PATENT DOCUMENTS 1,206,759 11/1916 Hanaver ............................... 16/4 X
4,069,542 1/1978 Carder ..................................... 16/16

Primary Examiner—Fred A. Silverberg

[57] ABSTRACT

A structure for attaching carpeting to a vehicle body comprises a carpet support member fixedly supported between an upper edge of a side sill panel and a floor panel. The support member has a sawtooth-edged cut-out along one edge at a point opposite a pillar defined by a pillar inner member and a pillar outer member, these members being fixed to the side sill panel, and a pillar casing, the lower end of which has a substantially trapezoidal shape and which is mounted on the pillar so as to compress the floor carpet against the deformable sawteeth of the carpet support member.

6 Claims, 8 Drawing Figures

RESILIENT STRUCTURE FOR SECURING CARPETING OF DIFFERENT THICKNESSES

BACKGROUND OF THE INVENTION

1. Field of the Invention

The present invention relates generally to a structure for attaching floor carpeting to a vehicle body interior, and specifically to the structural elements of the vehicle body to which the floor carpeting is appropriately attached, wherein floor carpeting of any thickness can fit into a gap provided between the lower end of a casing such as a center pillar garnish and the upper surface of a carpet support member which is supported by a side sill panel and a floor panel.

2. Description of the Prior Art

A conventional structure for attaching carpeting to a vehicle body is described below.

A structure for attaching carpeting to a vehicle body thereto comprises: (a) a floor panel; (b) a side sill inner panel; (c) a side sill outer panel attached to the side sill inner panel; (d) a center pillar outer member, the lower end of which is attached to the top edge of the side sill outer panel; and (e) a center pillar inner member, the lower end of which is attached to the top edge of the side sill outer panel to which the upper edge of the side sill inner panel is fixed.

A carpet support member is located so as to bridge the space between a floor panel and the upper edge of the side sill outer panel. An enclosed space is, therefore, defined below the carpet support member in conjunction with the floor panel and side sill inner panel. An electrical wire harness runs through this space. A cutout of substantially trapezoidal shape is provided along one edge of the carpet support member and onto the sloping surface thereof opposite the lower end of a center pillar casing described hereinafter. A layer of floor carpeting rests on the carpet support member. The center pillar casing is mounted so as to cover the center pillar inner member. The lower end of the center pillar garnish is substantially trapezoidal. The inner surface of the lower end of the center pillar casing is brought into close contact with the floor carpeting over the cutout of the carpet support member. It should be noted that the edge of the floor carpeting other than the portion enclosed by the lower end of the center pillar casing is enclosed by a kicking plate. It should also be noted that the distance between the lower end of the center pillar casing and the carpet support member is previously designed to be narrower than the thickness of ordinary floor carpeting. Care is taken to prevent a gap from occurring between the floor carpeting and the lower end of the center pillar casing. Therefore, the portion of the floor carpeting which is positioned over the cutout of the carpet support member is depressed into the cutout due to the force applied by the trapezoidal lower end of the center pillar casing when the center pillar casing is mounted on the center pillar inner member. Since the contact area between the lower end of the center pillar casing and the floor carpeting is accordingly reduced, the reactive force of the floor carpeting against the center pillar casing is reduced, so that the center pillar casing can be easily installed in its intended position on the center pillar inner member and the floor carpet rests properly on the carpet support member while remaining clamped in place by the lower end of the center pillar casing. Consequently, the floor carpet can fixedly be attached to the floor panel and carpet support member.

However, there is a problem in such a structure for attaching carpeting to a vehicle body in the case of floor carpet thicker that normal for use in a luxury automotive vehicle. Since the cut-out provided in the carpet support member of the structure described above extends only partly as far down as does the lower the center pillar casing, the lower end of the center pillar garnish is pushed upward during its assembly onto the vehicle body due to the increased thickness of the floor carpet. Consequently, the center pillar casing cannot be mounted in its normal position on the center pillar inner member.

In addition, there exists another problem in the case of floor carpeting thinner than normal for use in an economy automotive vehicle. In this case, a gap will exist between the trapezoidal lower end of the center pillar casing and the floor carpeting so that the appearance around such a pillar casing is adversely affected, efficiency of assembly of such a pillar casing is reduced, and, in the worst case, the floor carpet may gradually separate from the carpet support member due to repetitive applications of external forces on the floor carpeting.

SUMMARY OF THE INVENTION

With the above-described problems in mind, it is an object of the present invention to provide an improved structure for attaching carpeting substantially permanently to the vehicle body, wherein a sawtooth edged cutout is provided at a portion of a carpet support member opposite a pillar member, the lower edge of the sawtooth-edged cutout being directly opposite the lowest edge of a trapezoidal lower end of a pillar casing and the pillar casing is mounted on the pillar member such that the trapezoidal lower end thereof compresses the portion of the floor carpet positioned over the sawtooth-edged cutout.

BRIEF DESCRIPTION OF THE DRAWINGS

A more complete understanding of the present invention may be obtained from the following detailed description taken in conjunction with the drawings in which like reference numerals designate corresponding elements and in which.

DETAILED DESCRIPTION OF THE PREFERRED EMBODIMENTS

Reference will be made to the drawings in order to facilitate understanding of the present invention.

Figure 1:
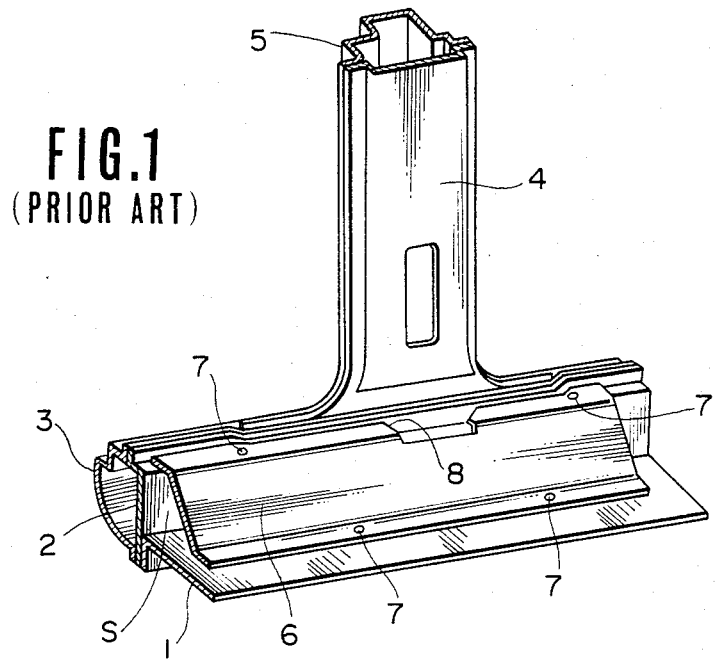
FIG. 1 is a perspective view of a section of a conventional structure for attaching floor carpeting to a vehicle body before the floor carpet and center pillar casing are installed on the vehicle body.

FIG. 1 shows a conventional structure of a vehicle body for attaching floor carpeting, in particular the periphery of a center pillar. A pillar casing such as a center pillar casing and the floor carpeting itself are omitted from FIG. 1.

Figure 2:
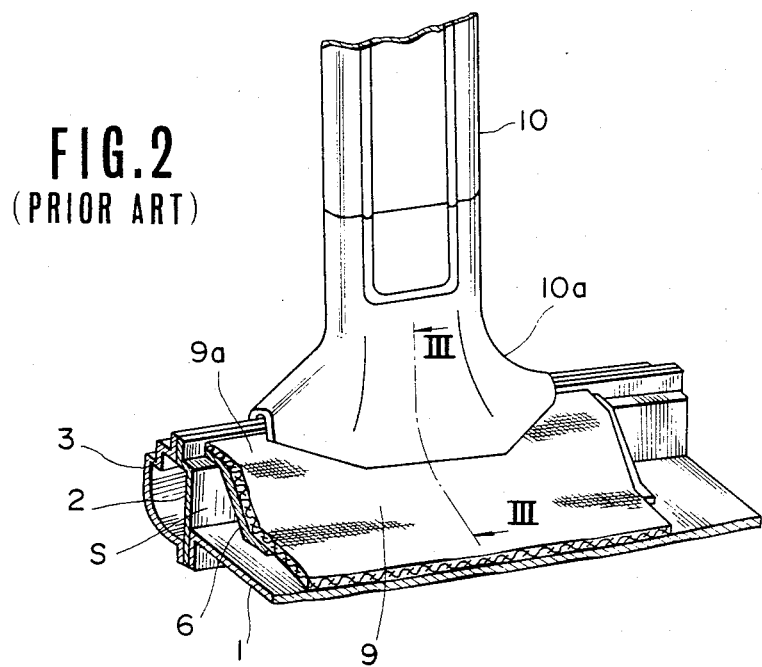
FIG. 2 is a perspective view of the conventional structure shown in FIG. 1 with the floor carpeting installed.

FIG. 2 shows the conventional structure of the vehicle body for attaching the floor carpeting. In this view, the center pillar casing and the floor carpeting are both installed in place over a corresponding panel of the vehicle body.

Figure 3:
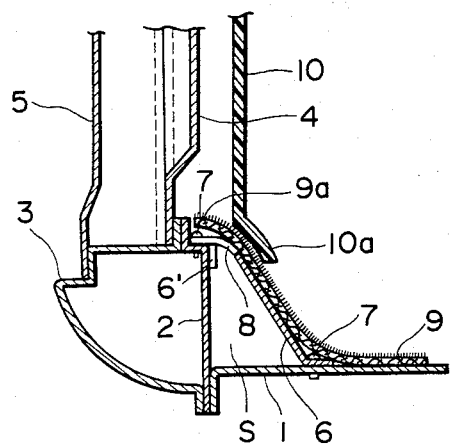
FIG. 3 is a cros-sectional view taken along the curve III—III of FIG. 2.
Figure 4:
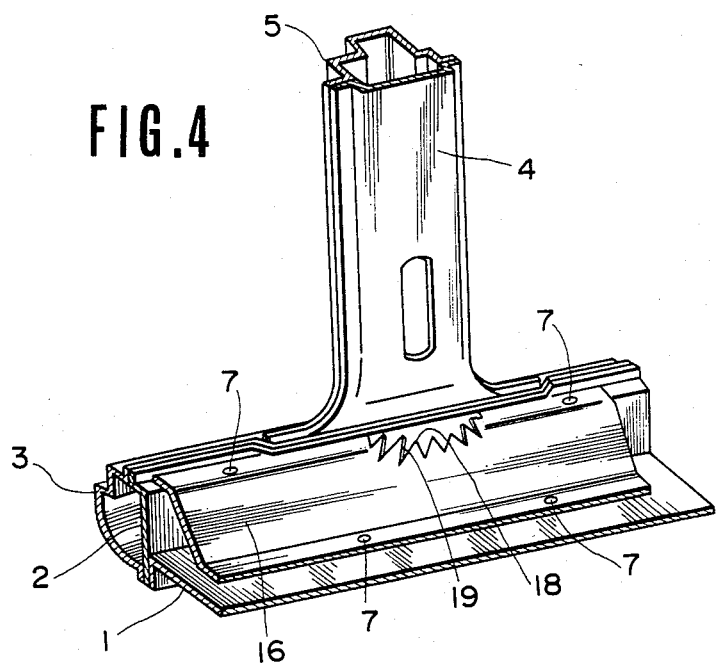
FIG. 4 is a perspective view of a section of a structure for attaching floor carpeting to the vehicle body according to a first preferred embodiment of the present invention before the floor carpet and center pillar casing are installed on the vehicle body.
Figure 5:
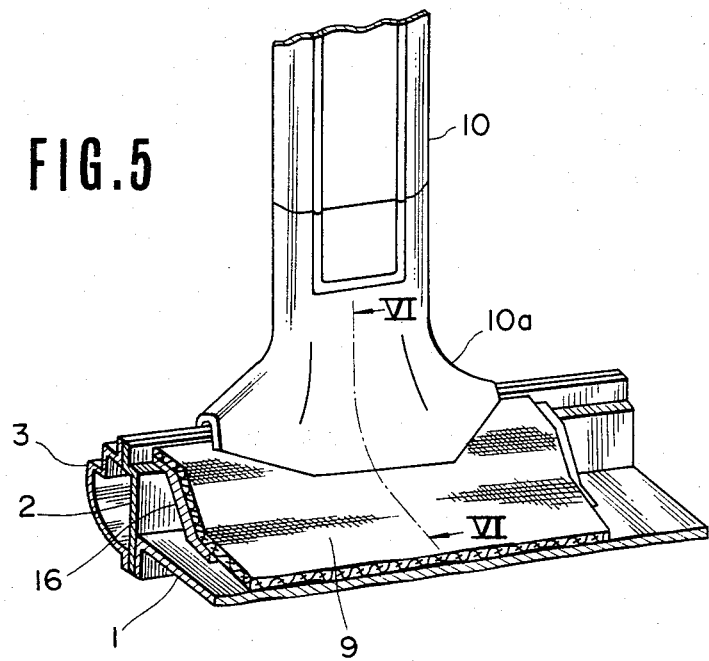
FIG. 5 is a view similar to FIG. 2 of the first embodiment of the present invention.

FIG. 3 shows a cross section of the structure shown in FIG. 2 taken along the curve III—III.

In these drawings, numeral 1 denotes a floor panel of the vehicle body and numeral 2 denotes a side sill inner panel elongated along the vehicle body. The floor panel 1 is bent downwards along one longitudinal edge and is fixed to the lower edge of the side sill inner panel 2. Numeral 3 denotes a side sill outer panel, to opposite sides of the inside, upper edge of which the upper edge of the side sill inner panel 2 and the lower end of a center pillar inner member 4 are fixed and to the outside, upper edge of which the lower end of a center pillar outer member 5 is fixed. Numeral 6 denotes a carpet support member, the upper edge of which is fixed to the upper edge of the side sill inner panel 2 by means of screws 7 and lower end of which is fixed to the floor panel 1 by means of screws 7. Therefore, as best seen in FIG. 3 a space S of substantially a triangular shape in cross-section is formed by these three members, i.e., side sill inner panel 2, floor panel 1, and floor carpet support member 6. An electrical wiring harness (not shown) runs through the space S. In FIG. 3, numeral 6' denotes a stopper member attached to the upper edge of the carpet support member 6 for securing the carpet support member 6 to the side sill inner panel 2.

As best seen in FIG. 1, and FIG. 2 a cutout 8 of substantially trapezoidal shape is provided along the outside edge of the carpet support member 6, i.e., the edge adjacent to the lower end of the center pillar inner member 4. The bottom edge of the cutout 8 extends onto the sloping portion of the carpet support member 6, which face the lower end 10a of a center pillar garnish 10 to be described hereinafter. A floor carpet 9 rests on the floor panel 1 and on the carpet support member 6. An inner surface of the trapezoidal lower end 10a of the center pillar casing 10 clamps part of the outside edge of the floor carpet 9 which rests on the cutout 8 provided in the carpet support member 6. The rest of the outside edge of the floor carpet 9 is later tightly clamped to the side sill inner panel 2 by means of a kicking plate (not shown). The clearance between the lower end 10a of the center pillar casing 10 and the carpet support member 6 is previously selected to be narrower than the thickness of the floor carpet 9 so that the clearance is completely filled by the floor carpet 9 when the center pillar casing 10 mounted on the center pillar inner member 4. Therefore, the portion of the outside edge 9a of the floor carpet 9 which rests on the cutout 8 of the carpet support member 6 is pushed into the cutout 8. The area of contact between the carpet 9 and the lower end 10a of the center pillar casing 10 is thus reduced so that the reactive force of the floor carpet 9 against the center pillar casing 10 is accordingly reduced. The center pillar casing 10 is fixed in place and the outside edge 9a of the floor carpet 9 is held in close contact with the upper surface of the carpet support member 6.

FIGS. 4 through 7 show a first preferred embodiment according to the present invention.

Figure 6:
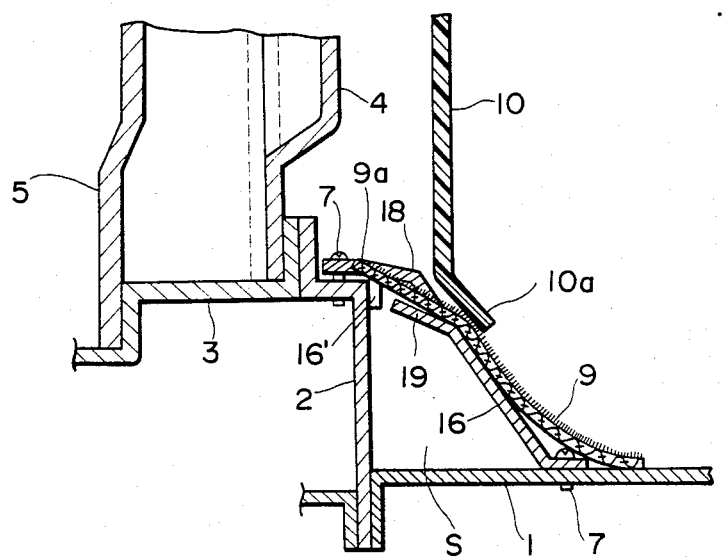
FIG. 6 is a cross sectional view taken along the curve VI—VI of FIG. 5.
Figure 7:
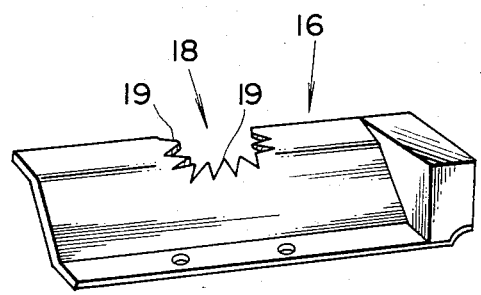
FIG. 7 is a perspective view of a carpet support member shown in FIGS. 4 through 6 having a sawtooth-edged cutout according to the present invention.

In these drawings, numeral 16 denotes the carpet support member which in accordance with the present invention has sawteeth 19 provided along the edges of the conventional trapezoidal cutout 18. The base of each of the sawteeth 19 starts on the sloping surface of the carpet support member 16 at a point opposite the lowest edge of the lower end 10a of the center pillar casing 10. The lower end 10a of the center pillar casing 10 acts to clamp the outside edge 9a of the floor carpet 9 which rests on the sawteeth 19 provided around the cutout 18. As shown in FIG. 6, a stooper member 16' is attached to the carpet support member 16.

As in the conventional structure, the carpet support member 16 is fixed to a point near the juncture of the side sill inner panel 2 and side sill outer panel 3 by means of the screw 7. The floor carpet 9 is layed over the carpet support member 16. The lower end 10a of the center pillar casing 10 pushes against the portion of the floor carpet 9 which rests on the sawteeth 19 of the cutout 18 provided in the carpet support member 16. In response, the sawteeth 19 tend to bend downward into the space S so that the reactive force between the lower end 10a of the center pillar casing 10 and the carpet 9 is reduced. The center pillar casing 10 can, thus, easily be fixed in place. In this way, since the reactive force of the floor carpet 9 against the center pillar casing 10 is reduced, floor carpeting of nearly any thickness can fit into the clearance between the lower end 10a of the center pillar casing 10 and carpet support member 16, provided the clearance is set to be slightly smaller than the thickness of regular floor carpeting 9. This also ensures that there will be no clearance between the lower end 10a of the center pillar casing 10 and the corresponding edge of the floor carpet 9 after the center pillar casing 10 is installed.

Figure 8:
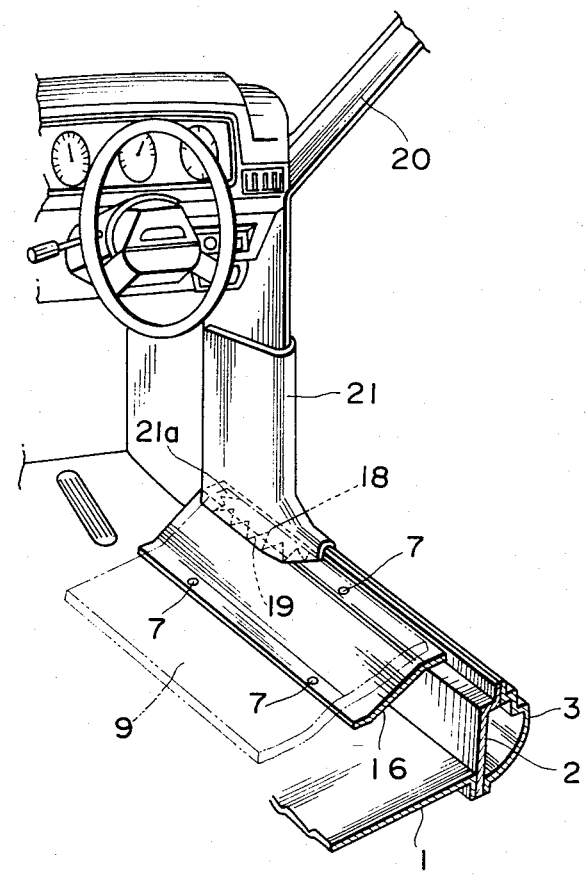
FIG. 8 is a perspective view of a section of a structure for attaching floor carpeting to the vehicle body according to a second preferred embodiment of the present invention.

FIG. 8 shows a second preferred embodiment according to the present invention.

In this embodiment, the cutout 18 edged with sawteeth 19 is located at one end of the outside edge of the carpet support member 16 opposite the lower end of a front pillar inner member 20. The outside edge 9a of the floor carpet 9 rests on the sawteeth 19 provided along the cutout 18. The lower end 21a of the front pillar casing 21 clamps the portion of the floor carpet 9 facing the sawteeth 19 of the cutout 18.

Although the preferred embodiments describe only the center pillar casing 10 and front pillar casing 21 as means for clamping the the floor carpet 9, a rear pillar casing may obviously also be used for this purpose.

In summary, sawteeth are provided around the edges of a cutout at the edge of a carpet support member extending between a side sill inner panel and a floor panel and the lower end of a pillar casing is installed so as to compress a portion of the floor carpet against the sawteeth of the cutout. Therefore, relatively thin floor carpeting can be securely clamped in the clearance between the lower end of the pillar casing and the carpet support member. In addition, thicker floor carpeting can also fit into the clearance since the sawteeth will bend to accommodate the floor carpet in response to the compression force of the pillar casing and so the reactive force of the floor carpet against the lower end of a pillar casing will also be reduced. Consequently, the pillar casing can also easily be fitted into place.

It will be fully understood by those skilled in the art that various modifications may be made in the preferred embodiments described hereinbefore without departing the spirit and scope of the present invention, which is defined by the appended claims.

What is claimed is:

1. A structure for attaching floor carpeting to a vehicle body, the vehicle body including a floor panel, a side sill inner panel, the lower edge of which is attached to one edge of the floor panel, a side sill outer panel, one upper edge of which is attached to an upper edge of the side sill inner panel and the lower edge of which is attached to a lower edge of the side sill inner panel, a pillar inner member, the lower edge of which is attached to an upper edge of the side sill outer panel, the structure comprising:

(a) a carpet support member located below the pillar inner member and serving as a substrate for a layer of the floor carpeting, a first edge of which is attached to the upper end of the side sill inner panel and the other edge of which is attached to the floor panel to form a space of a substantially triangular cross-section in conjunction with the side sill inner panel and the floor panel, said carpet support member having a substantially trapezoidal cutout edged with a plurality of resilient structural members and located along the first edge at a point opposite the lower end of the pillar inner member; and (b) a pillar casing mounted on the pillar inner member such that the lower end thereof compresses the floor carpeting against the edges of said cutout, whereby said plurality of resiliently structural members flex into the space of substantially triangular cross-section when the lower end of said pillar casing compresses the floor carpeting against the edges of said trapezoidal cutout to thereby reduce the reactive force of the floor carpeting against the pillar casing so that the floor carpeting of nearly any thickness can be secured.

2. The structure according to claim 1, wherein said plurality of resilient structural members edging said cutout of the carpet support member are provided with sawteeth.

3. The structure according to either claim 1 or claim 2, wherein the lower edge of said cutout and the lower edge of said pillar casing are at the same elevation above the floor panel.

4. The structure according to claim 3, wherein said pillar casing is a center pillar casing.

5. The structure according to claim 3, wherein the pillar casing is a front pillar casing.

6. The structure according to claim 1, wherein the distance between the lower end of said pillar casing and said carpet support member is previously set to be less than the predetermined thickness of the floor carpeting before being compressed.

* * * * *